June 25, 1935.  W. HOLM  2,006,101
REVERSING MECHANISM FOR DRY GAS METERS
Filed July 3, 1933 4 Sheets-Sheet 4
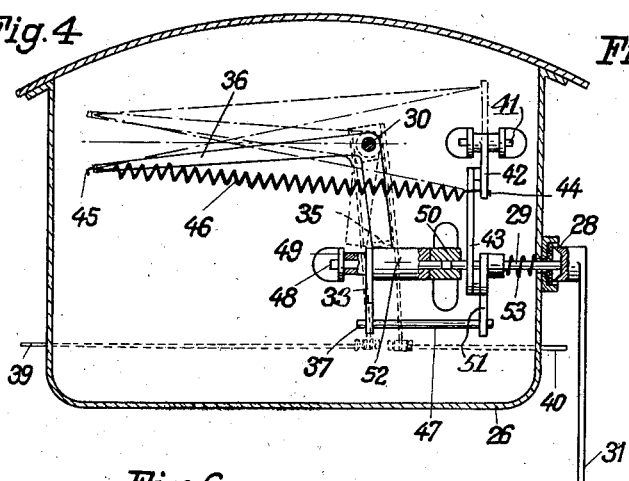
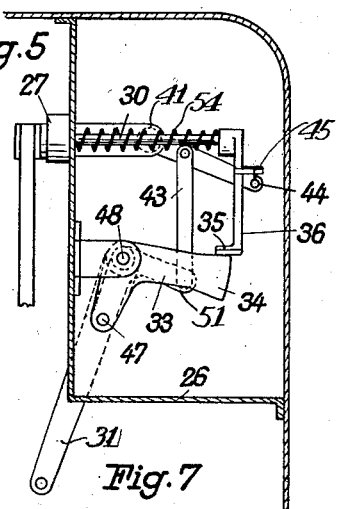
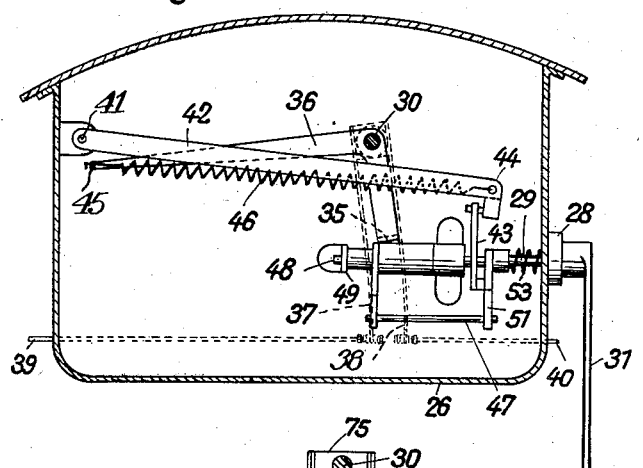
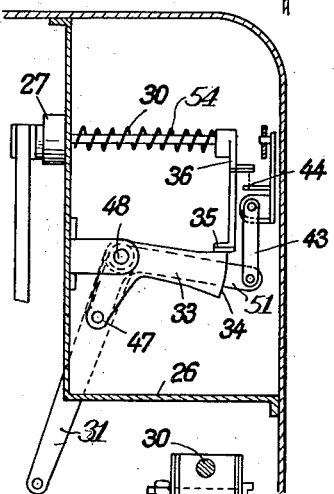
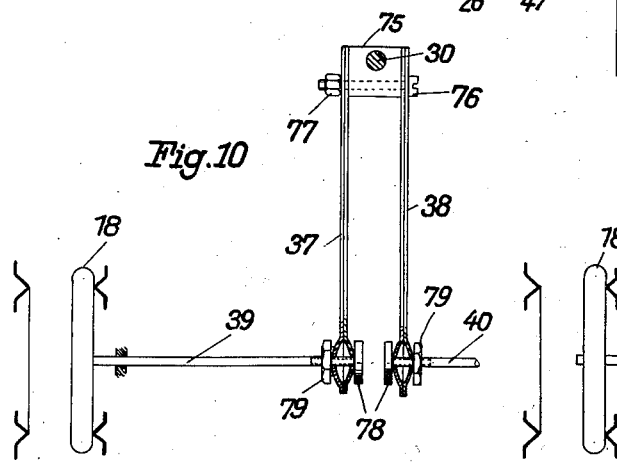
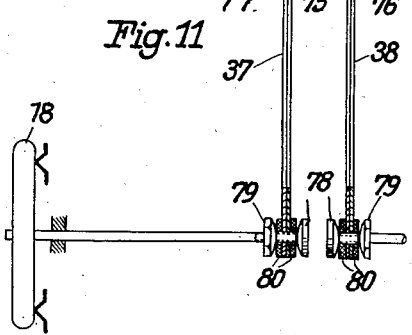
Inventor:
W. Holm
By: Marks & Clerk
Attys.

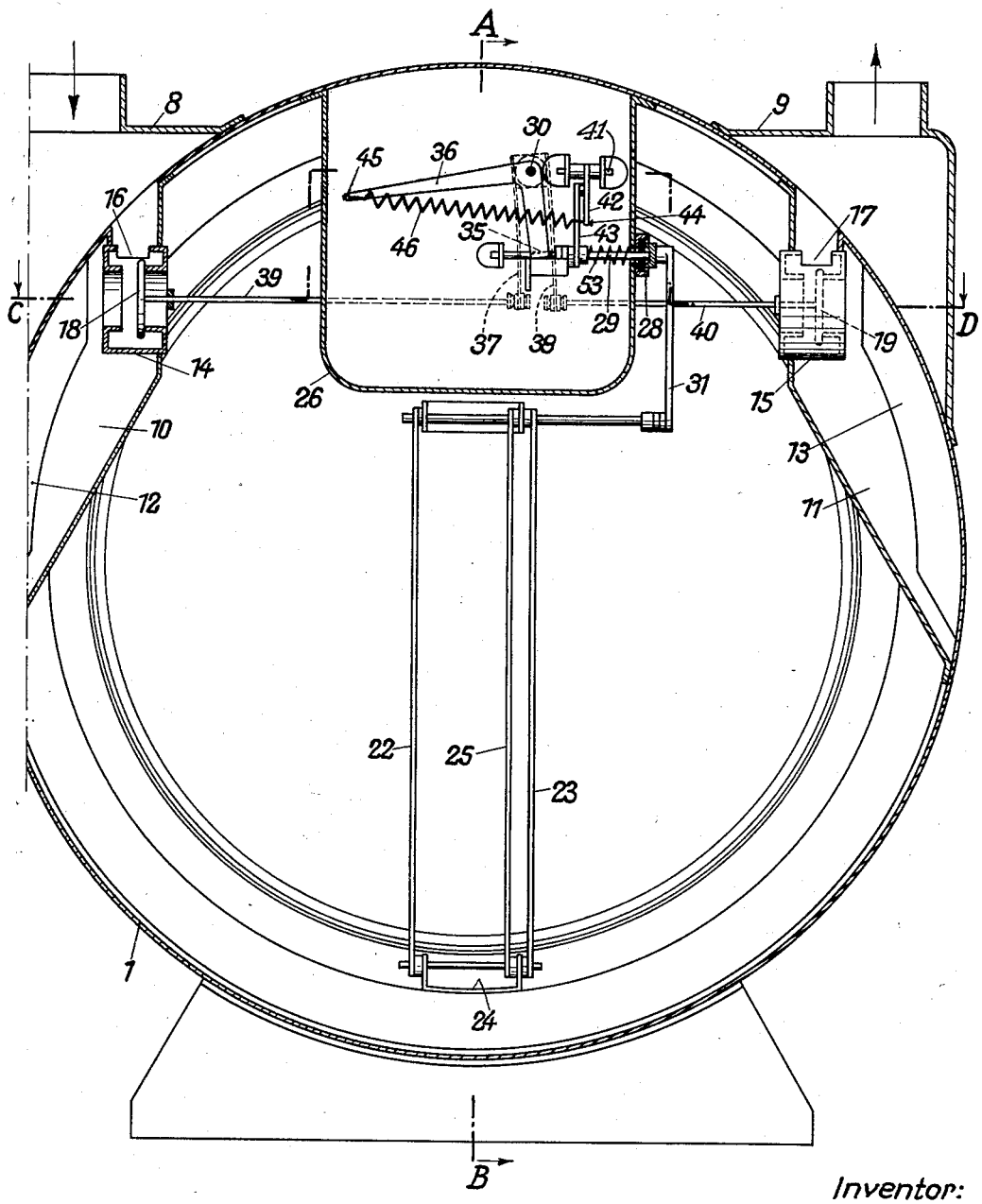

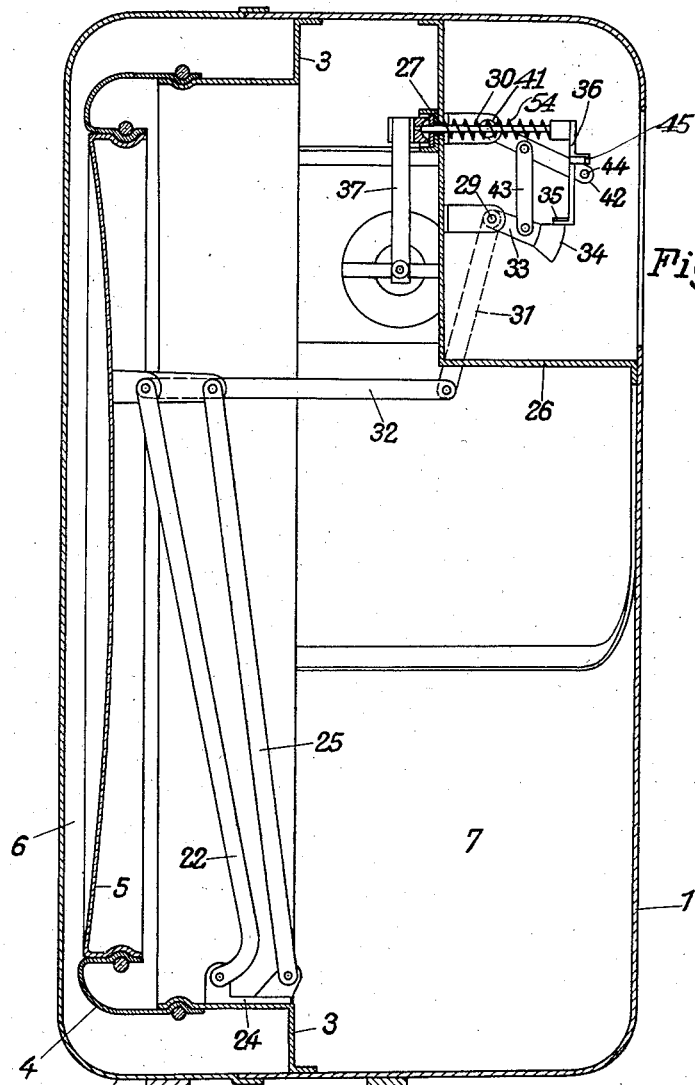
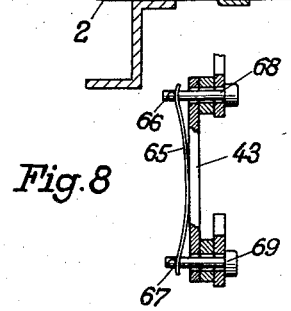
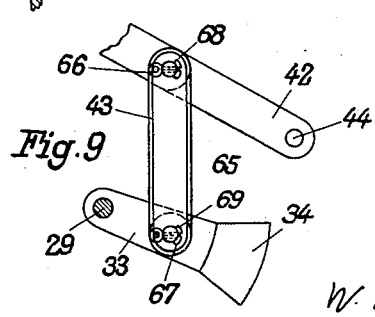

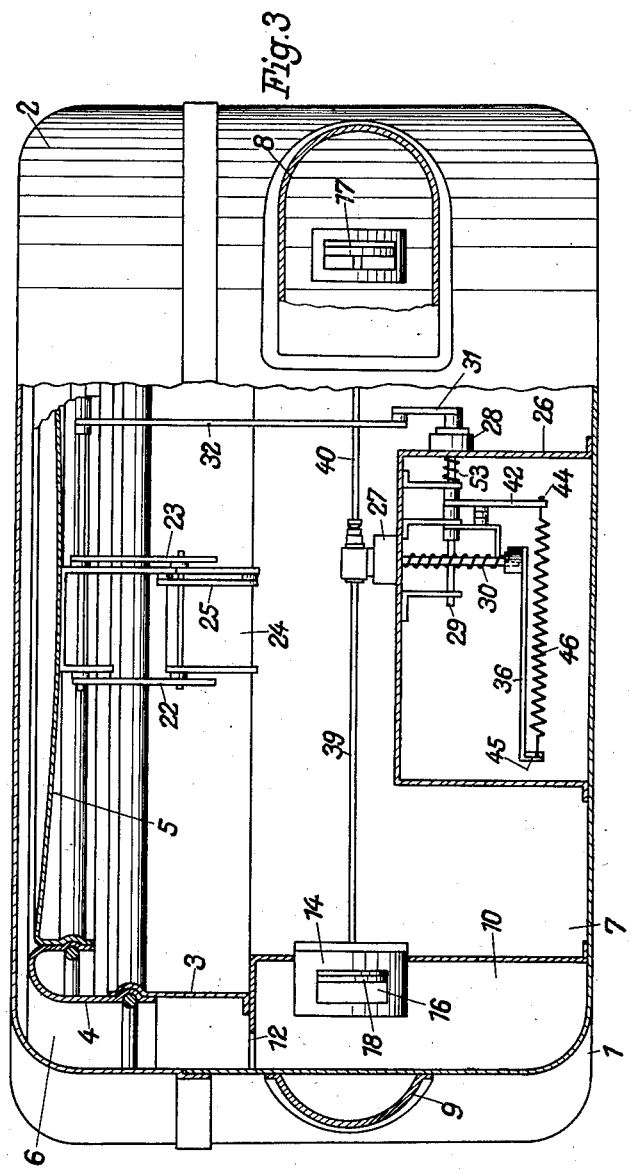

Patented June 25, 1935

2,006,101

UNITED STATES PATENT OFFICE 2,006,101

REVERSING MECHANISM FOR DRY GAS METERS

Waldemar Holm, Furstenwalde/Spree, Germany, assignor to N. V. Machinerieen-en Apparaten Fabrieken "Meaf", Utrecht, Netherlands Application July 3, 1933, Serial No. 678,967
In Germany July 5, 1932

11 Claims. (Cl. 73—1)

This invention relates to dry gas meters of the known type in which the movement of the diaphragm is transmitted to a reversing mechanism which reverses the valves of the gas meter at the end of the strokes of the diaphragm.

The invention has more particular for its object a reversing mechanism which is adapted to be arranged within a separate casing within the gas meter housing in order to protect it against the gas flowing through the meter, thus avoiding damages of the mechanism caused by dirt or corrosive components of the gas. A further advantage of the reversing mechanism according to this invention is that the shafts of the snap members by means of which the valves are kept in their position up to the moment when the diaphragm has reached the end of its stroke are arranged perpendicular in relation to each other. By this it becomes possible to design the mechanism small enough to be placed into the separate casing referred to above without diminishing its reliability.

A further object of this invention is to provide means for diminishing as far as possible the noise of the mechanism, in order to be able to use the gas meter in inhabited rooms without any trouble.

The invention will now be described with reference to the accompanying drawings in which Fig. 1 shows a gas meter provided with a reversing mechanism according to this invention, the front plate of the gas meter housing being removed, Fig. 2 is a section through the gas meter taken along line AB of Fig. 1, Fig. 3 is a section taken along line CD of Fig. 1, Fig. 4 shows a modification of the reversing mechanism in front view, while Fig. 5 is an end view of same, Fig. 6 is another modification of the reversing mechanism in front view, Fig. 7 shows same in end view;

Fig. 8 shows a possible modification of a detail of the reversing mechanism in front view and Fig. 9 in end view;

Fig. 10 shows the leaf spring for transmitting the movement of the reversing mechanism to the spindles of the valves, Fig. 11 shows a modification of this leaf spring.

Referring now to Figs. 1 to 3, the gas meter housing consists of the front casing 1 and the back casing 2. Inside the front casing 1 there is provided the diaphragm ring 3 carrying the diaphragm 4 which diaphragm is provided with the diaphragm plate 5. This ring together with the diaphragm divides the interior of the casing into two measuring chambers, the front measuring chamber 7 and the back measuring chamber 6. Below the connector casings 8 and 9 for the gas inlet and outlet respectively segment shaped chambers 10 and 11 are arranged which are connected by the openings 12 and 13 with the back measuring chamber 6. Each of these chambers is provided with a double seat valve housing (14 and 15). These valve housings have apertures 16 and 17 which communicate with the inlet connector casing 8 and the outlet connector casing 9 respectively. The outer seats of these valve housings connect same with the back measuring chamber 6, whereas the inner ones connect them with the front measuring chamber 7.

The operation of the gas meter is the following. In the position of the valves shown in the drawings the gas entering through the inlet passes the connector casing 8 and through the aperture 16 enters the valve housing 14. The outer seat being not covered by the valve disc 18 the gas passes through chamber 10 and opening 12 into the back measuring chamber 6. The diaphragm 5 thereby is moved towards the front of the gas meter and pushes the gas contained in the front measuring chamber 7 through the uncovered inner seat of the valve housing 15, aperture 17 and connector casing 9 to the outlet of the gas meter. When the diaphragm has finished its stroke in this direction the valves are reversed by the reversing mechanism referred to later on. Then the gas entering the gas meter passes through the inner valve seating of valve housing 14 into the front measuring chamber 7, pushing the diaphragm back again. Thereby the gas in the back measuring chamber 6 is forced to leave the gas meter through the opening 13, the outer seating of the valve housing 15 and through the outlet connector casing 9. The diaphragm plate is guided by means of two levers 22 and 23 pivotally mounted on a bracket 24 arranged inside the diaphragm ring 3. A rod 25 ensures a guidance of the diaphragm plate 5 in parallel fashion.

Behind the front plate of the front casing 1 a gas tight box 26 is arranged containing the reversing mechanism and the counting mechanism. In the wall of this box two glands 27 and 28 are provided, one for leading through the shaft 29 by means of which the reversing mechanism is driven, the other one for leading through the shaft 30 by means of which the reversal is transmitted to the valves. The shafts 29 and 30 each are provided with springs 53 and 54 respectively by means of which the glands 28 and 27 are tightened so that no gas can enter the box 26. Outside the box 26 the shaft 29 carries a lever 31 which is connected to the diaphragm plate 5 by a link 32. Inside the box the shaft 29 carries the guide lever 33. This guide lever ends in a snap member 34, engaging with a corresponding snap member 35 on the tilting lever 36. This angular shaped tilting lever is fastened rigidly to the shaft 30. This shaft 30 carries outside the box 26 two leaf springs 37 and 38 engaging with the spindles 39, 40 of the two valves 18 and 19. Parallel to the shaft 29 a further shaft 41 is arranged in a suitable bearing which shaft carries the suspension lever 42. This lever is connected to the guide lever 33 by means of the link 43. Between the free end 44 of the suspension lever 42 and the other end 45 of the tilting lever 36 the reversing spring 46 is suspended.

The operation of the tilting mechanism is the following. In the position shown in the drawings, the gas entering the back measuring chamber 6 will push the diaphragm, in the view shown in Fig. 2, to the right. By means of the link 32 the lever 31 is taken to the right, thus turning the shaft 29 and the guide lever 33. The suspending lever 42 coupled to the guide lever 33 by the link 43 pivots round its shaft 41. The tilting lever 36 during the stroke of the diaphragm remains in its position as its snap member 35 resting against the snap member 34 of the guide lever prevents it from moving. While the one point, 45, to which the spring 46 is attached therefore remains in its position, the other suspension point 44 is moving upwards, whereby the spring 46 becomes tensioned. During this movement the line of stress of the spring 46, line 44, 45 passes the shaft 30 (see Fig. 1). When the diaphragm has reached the end of its stroke, the snap member 34 of the guide lever 33 releases the snap member 35 of the tilting lever 36. Under the influence of the stress of the spring 46 which has become tensioned during the aforegoing stroke, the tilting lever 36 suddenly will tilt over, thereby turning the shaft 30. The leaf springs 37 and 38 impart this movement to the spindles 39 and 40, whereby the valves 16 and 17 are reversed. In consequence of this the incoming gas now enters the front measuring chamber 7 thus pushing the diaphragm plate 5 back again. In the reversing mechanism the guide lever 33 and the suspension lever 42 are moving in opposite directions, while the tilting lever 36 is prevented from moving by its snap member 35 now resting against the other face of the snap member 34. The spring 46 is again tensioned and at the end of the stroke of the diaphragm when the snap member 35 is released again effects the reversal of the valves. A counting mechanism coupled to the shaft 29, which mechanism is not shown in the drawings in order not to complicate same too much, serves for indicating the quantity of gas that passed through the meter.

Heretofore reversing mechanisms which are somehow similar to the one described above have been known in which however the tilting spring is fastened to the tilting lever and to the guide lever. The principal feature of this invention which makes this tilting mechanism differ from those known is the arrangement of the suspension lever which entails the advantage that the movement of the spring is symmetrical. Thereby the loss of pressure of the gas meter which has to be within certain limits becomes the same when the diaphragm is moving forward and backward.

Figs. 4 and 5 show a modification of the reversing mechanism in which the guide lever 33 carrying the snap member 34 is bell-crank shaped and is fastened to a separate shaft 48 arranged in alinement with the shaft 29 which carries outside the box 26 the lever 31. To the shaft 29 is fastened the bell-crank lever 51 carrying on one of its arms a pin 47 projecting through a hole in the one arm of the guide lever 33 whereby the movement of the shaft 29 is imparted to the shaft 48. The other arm of the bell-crank lever 51 is coupled by means of the link 43 with the suspending lever 42. The hub 52 of the guide lever 33 rests on both ends against the bearings 49 and 50. The purpose of this arrangement is to prevent the stress of the reversing spring 46 to exercise an unfavourable influence on the spring 53 of the gland 28. As this stress in the previously described reversing mechanism when the snap member 35 rests against the one face of the snap member 34, tends to increase the stress of the spring 53 and when it rests against the other face tends to decrease the stress of the spring 53, the resistance during the forward and the backward stroke will be different. This drawback is avoided by this arrangement.

A further modification of the reversing mechanism is shown in Figs. 6 and 7. In this modification the arrangement of the shaft 29 carrying the bell-crank lever 51, of the shaft 48 carrying the guide lever 33 and of the shaft 30 carrying the tilting lever 36 is the same as in the modification shown in Figs. 4 and 5. The shaft 41 of the suspension lever 42, however, is arranged not parallel to the shaft 29 as in the reversing mechanisms described before but at right angles to it. The reversing spring 46 is suspended between the one end 45 of the tilting lever 36 and the free end 44 of the suspending lever 42, the latter being coupled by means of the link 43 with the bell-crank lever 51. By the arrangement of the shaft 41 at right angles to the shaft 29 the strain which is exerted by the varying stress of the reversing spring 46 is better checked than with the heretofore described arrangement, this stress now being directed perpendicular to the shaft 41.

Figs. 8 and 9 show a modification of the connection of the suspension lever 42 and the guide lever 33, the purpose of which is to reduce as far as possible noise that easily arises in the joints of the link 43 with these levers at the sudden reversal of the reversing mechanism. This is attained by means of a leaf spring 65 which at its ends rests against the split pins 66 and 67 provided in the pivots 68 and 69 of the levers 42 and 33. This leaf spring rests in the middle part against the link 43, thus causing a little friction between these levers which friction prevents the joints from clattering. The modification shown in Figs. 8 and 9 may also be applied to the devices shown in Figs. 4, 5 and 6, 7 respectively for coupling the suspending lever 42 and the bell-crank lever 51.

The leaf springs 37 and 38 which serve for transmitting the sudden movement of the reversing lever 36 to the spindles 39 and 40 of the valves 18 and 19 of the gas meter are shown in detail in Fig. 10, Fig. 11 showing a modification. The shaft 30 projecting from the box 26 carries a block 75. To this block the leaf springs 37 and 38 are fastened by means of the screw 76 provided with the nut 77. Each of the leaf springs 37, 38 consists of two leaves. At the end where these leaf springs engage with the spindles 39 and 40 of the valves 18 and 19 the leaves are bulged out and are provided with a hole through which the spindles extend. The spindles rest with collars 78 provided thereon against the embossment of the one leaf while nuts 79 threaded on the spindle engage with the embossment of the other leaf. By this arrangement an elastic connection between the leaf springs 37 and 38 and the valve spindles 39, 40 is attained whereby the occurrence of noise at this connection when the valves are reversed is avoided.

The same purpose is attained with the modification shown in Fig. 11. In this modification the leaves of the leaf springs 37 and 38 which are fastened to the block 75 by means of the screw 76 and the nut 77 are not bulged out, discs 80 of elastic material, such as felt, rubber, leather or the like being provided instead between the leaf springs and the collar 78 and the nut 79.

I claim:

1. In a dry gas meter with one diaphragm and with two double seat valves provided with spindles, a reversing mechanism comprising a shaft actuated by the diaphragm, a guide lever on this shaft, a snap member on this guide lever, a second shaft arranged perpendicular to the shaft of the guide lever, a tilting lever provided with two legs on said second shaft, a snap member on one of the legs of the tilting lever, adapted to cooperate with the snap member on the guide lever, a third shaft arranged parallel to the shaft of the guide lever, a suspending lever on this third shaft, a link for coupling the suspending lever with the guide lever, a reversing spring fastened on one end to the other leg of the tilting lever and on the other end to the suspending lever, and means for transmitting the movement of the shaft of the tilting lever to the spindles of the double valves of the gas meter.

2. In a dry gas meter with one diaphragm and with two double seat valves provided with spindles, a reversing mechanism comprising a shaft actuated by the diaphragm, a bell-crank lever on this shaft, a second shaft, arranged in alinement with the first shaft, a guide lever on this shaft, a pin on the said bell-crank lever for coupling same with the guide lever, a snap member on said guide lever, a third shaft, arranged perpendicular to the shaft of the guide lever, a tilting lever provided with two legs on said third shaft, a snap member on one of the legs of the tilting lever adapted to cooperate with the snap member on the guide lever, a further shaft arranged parallel to the shaft of the guide lever, a suspending lever on this shaft, a link for coupling the suspending lever with the said bell-crank lever, a reversing spring fastened on one end to the other leg of the tilting lever and on the other end to the suspending lever, and means for transmitting the movement of the shaft of the tilting lever to the spindles of the double valves of the gas meter.

3. In a dry gas meter with one diaphragm and with two double seat valves provided with spindles, a reversing mechanism comprising a shaft actuated by the diaphragm, a bell-crank lever on this shaft, a second shaft, arranged in alinement with the first shaft, a guide lever on this shaft, a pin on the said bell-crank lever for coupling same with the guide lever, a snap member on said guide lever, a third shaft, arranged perpendicular to the shaft of the guide lever, a tilting lever provided with two legs on said third shaft, a snap member on one of the legs of the tilting lever adapted to cooperate with the snap member on the guide lever, a further shaft arranged perpendicular to the shaft of the guide lever, a suspending lever on this shaft, a link for coupling the suspending lever with the said bell-crank lever, a reversing spring fastened on one end to the other leg of the tilting lever and on the other end to the suspending lever, and means for transmitting the movement of the shaft of the tilting lever to the spindles of the double valves of the gas meter.

4. In a dry gas meter with one diaphragm and with two double seat valves provided with spindles, a reversing mechanism comprising a shaft actuated by the diaphragm, a guide lever on this shaft, a snap member on this guide lever, a second shaft arranged perpendicular to the shaft of the guide lever, a tilting lever provided with two legs on said second shaft, a snap member on one of the legs of the tilting lever, adapted to cooperate with the snap member on the guide lever, a third shaft arranged parallel to the shaft of the guide lever, a suspending lever on this third shaft, pivots on the guide lever and on the suspending lever, split pins in said pivots, a link engaging with these pivots for coupling the suspending lever and the guide lever, a leaf spring resting with its ends against said split pins and with its middle part against the said link, a reversing spring fastened on one end to the other leg of the tilting lever and on the other end to the suspending lever, and means for transmitting the movement of the shaft of the tilting lever to the spindles of the double valves of the gas meter.

5. In a dry gas meter with one diaphragm and with two double seat valves provided with spindles, a reversing mechanism comprising a shaft actuated by the diaphragm, a bell-crank lever on this shaft, a second shaft, arranged in alinement with the first shaft, a guide lever on this shaft, a pin on the said bell-crank lever for coupling same with the guide lever, a snap member on said guide lever, a third shaft, arranged perpendicular to the shaft of the guide lever, a tilting lever provided with two legs on said third shaft, a snap member on one of the legs of the tilting lever adapted to cooperate with the snap member on the guide lever, a further shaft arranged parallel to the shaft of the guide lever, a suspending lever on this shaft, pivots on the suspending lever and on the said bell-crank lever, split pins in said pivots, a link engaging with these pivots for coupling the bell-crank lever and the suspending lever, a leaf spring resting with its ends against said split pins and with its middle part against the said link, a reversing spring fastened on one end to the other leg of the tilting lever and on the other end to the suspending lever, and means for transmitting the movement of the shaft of the tilting lever to the spindles of the double valves of the gas meter 6. In a dry gas meter with one diaphragm and with two double seat valves provided with spindles, a reversing mechanism comprising a shaft actuated by the diaphragm, a bell-crank lever on this shaft, a second shaft, arranged in alinement with the first shaft, a guide lever on this shaft, a pin on the said bell-crank lever for coupling same with the guide lever, a snap member on said guide lever, a third shaft, arranged perpendicular to the shaft of the guide lever, a tilting lever provided with two legs on said third shaft, a snap member on one of the legs of the tilting lever adapted to cooperate with the snap member on the guide lever, a further shaft arranged perpendicular to the shaft of the guide lever, a suspending lever on this shaft, pivots on the suspending lever and on the said bell-crank lever, split pins in said pivots, a link engaging with these pivots for coupling the bell-crank lever and the suspending lever, a leaf spring resting with its ends against said split pins and with its middle part against the said link, a reversing spring fastened on one end to the other leg of the tilting lever and on the other end to the suspending lever, and means for transmitting the movement of the shaft of the tilting lever to the spindles of the double valves of the gas meter.

7. In a dry gas meter with one diaphragm and with two double seat valves provided with spindles, a reversing mechanism comprising a shaft actuated by the diaphragm, a guide lever on this shaft, a snap member on this guide lever, a second shaft arranged perpendicular to the shaft of the guide lever, a tilting lever provided with two legs on said second shaft, a snap member on one of the legs of the tilting lever, adapted to cooperate with the snap member on the guide lever, a third shaft arranged parallel to the shaft of the guide lever, a suspending lever on this third shaft, a link for coupling the suspending lever with the guide lever, a reversing spring fastened on one end to the other leg of the tilting lever and on the other end to the suspending lever, a block fastened to the shaft of the tilting lever and two leaf springs connected to the said block and engaging with the spindles of the valves, each spring comprising two leaves being bulged out at the point of engagement with the spindles.

8. In a dry gas meter with one diaphragm and with two double seat valves provided with spindles, a reversing mechanism comprising a shaft actuated by the diaphragm, a bell-crank lever on this shaft, a second shaft, arranged in alinement with the first shaft, a guide lever on this shaft, a pin on the said bell-crank lever for coupling same with the guide lever, a snap member on said guide lever, a third shaft, arranged perpendicular to the shaft of the guide lever, a tilting lever provided with two legs on said third shaft, a snap member on one of the legs of the tilting lever adapted to cooperate with the snap member on the guide lever, a further shaft arranged parallel to the shaft of the guide lever, a suspending lever on this shaft, a link for coupling the suspending lever with the said bell-crank lever, a reversing spring fastened on one end to the other leg of the tilting lever, and on the other end to the suspending lever, a block fastened to the shaft of the tilting lever and two leaf springs connected to the said block and engaging with the spindles of the valves, each spring comprising two leaves being bulged out at the point of engagement with the spindles.

9. In a dry gas meter with one diaphragm and with two double seat valves provided with spindles, a reversing mechanism comprising a shaft actuated by the diaphragm, a bell-crank lever on this shaft, a second shaft, arranged in alinement with the first shaft, a guide lever on this shaft, a pin on the said bell-crank lever for coupling same with the guide lever, a snap member on said guide lever, a third shaft, arranged perpendicular to the shaft of the guide lever, a tilting lever provided with two legs on said third shaft, a snap member on one of the legs of the tilting lever adapted to cooperate with the snap member on the guide lever, a further shaft arranged perpendicular to the shaft of the guide lever, a suspending lever on this shaft, a link for coupling the suspending lever with the said bell-crank lever, a reversing spring fastened on one end to the other leg of the tilting lever and on the other end to the suspending lever, a block fastened to the shaft of the tilting lever and two leaf springs connected to the said block and engaging with the spindles of the valves, each spring comprising two leaves being bulged out at the point of engagement with the spindles.

10. In a dry gas meter with one diaphragm and with two double seat valves provided with spindles, a reversing mechanism comprising a shaft operatively connected to and actuated by the diaphragm, a guide lever on this shaft, a snap member on this guide lever, another shaft arranged perpendicular to the shaft of the guide lever, a tilting lever provided with two legs on said other shaft, a snap member on one of the legs of the tilting lever, adapted to cooperate with the snap member on the guide lever, a further shaft, a suspending lever on this shaft, means for operatively connecting the suspending lever with the guide lever, a reversing spring fastened on one end to the other leg of the tilting lever and on the other end to the suspending lever, and means for transmitting the movement of the shaft of the tilting lever to the spindles of the double valves of the gas meter.

11. In a dry gas meter with one diaphragm and with two double seat valves provided with spindles, a reversing mechanism comprising a shaft actuated by the diaphragm, a bell-crank lever on this shaft, a second shaft, arranged in alinement with the first shaft, a guide lever on this shaft, a pin on the said bell-crank lever for coupling same with the guide lever, a snap member on said guide lever, a third shaft, arranged perpendicular to the shaft of the guide lever, a tilting lever provided with two legs on said third shaft, a snap member on one of the legs of the tilting lever adapted to cooperate with the snap member on the guide lever, a further shaft, a suspending lever on this shaft, a link for coupling the suspending lever with the said bell-crank lever, a reversing spring fastened on one end to the other leg of the tilting lever and on the other end to the suspending lever, and means for transmitting the movement of the shaft of the tilting lever to the spindles of the double valves of the gas meter.

WALDEMAR HOLM.